US012342124B2

(12) United States Patent
Zhang

(10) Patent No.: US 12,342,124 B2
(45) Date of Patent: Jun. 24, 2025

(54) MICROPHONE MODULE

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 198 days.

(21) Appl. No.: 18/327,032

(22) Filed: May 31, 2023

(65) Prior Publication Data

US 2024/0284093 A1 Aug. 22, 2024

Related U.S. Application Data

(63) Continuation of application No. PCT/CN2023/077285, filed on Feb. 21, 2023.

(51) Int. Cl.

*H04R 1/24* (2006.01)
*H04R 1/08* (2006.01)
*H04R 3/00* (2006.01)

(52) U.S. Cl.

CPC ............. *H04R 1/245* (2013.01); *H04R 1/086* (2013.01); *H04R 3/005* (2013.01); *H04R 2410/07* (2013.01); *H04R 2499/15* (2013.01)

(58) Field of Classification Search

CPC .......... H04R 1/222; H04R 1/24; H04R 1/245; H04R 1/26; H04R 1/265; H04R 1/086; H04R 2410/07; H04R 2499/15; H04R 3/005

See application file for complete search history.

(56) References Cited

FOREIGN PATENT DOCUMENTS

WO WO-2019074238 A1 * 4/2019 ......... G10L 21/0232

* cited by examiner

*Primary Examiner* — Kile O Blair

(74) *Attorney, Agent, or Firm* — Wiersch Law Group

(57) ABSTRACT

The present disclosure discloses a microphone module including a housing having a first sound channel penetrating thereon, a first support member, a first microphone mounted on the first support member and configured to pick up sound signal in full frequency rage, and a second microphone mounted on the first support member and configured to pick up sound signal in a frequency range of 700-1500 Hz; a first sound hole corresponding to the first microphone and a second sound hole corresponding to the second microphone are provided on the first support member; external sound wave entering the first sound channel is transmitted to the first microphone through the first sound hole; external sound wave entering the first sound channel is transmitted to the second microphone through the second sound hole. The microphone module in the present disclosure can balance the functions of external voice control, and siren detection and penetration.

5 Claims, 2 Drawing Sheets

100

MICROPHONE MODULE

FIELD OF THE PRESENT DISCLOSURE

The present disclosure relates to sound-electric conversion technologies, especially relates to a microphone module applied in automobile.

DESCRIPTION OF RELATED ART

With the development of the technologies, automobiles require microphones to be stalled both outside and inside. Generally, the microphone outside are used for voice control when the automobile is stationary and for siren detection and penetration function when the automobile is moving. When the microphone detects siren of police cars, fire trunks or ambulances nearby, it is necessary to activate the siren detection to replay the siren sound inside the automobile so as to remind drivers avoid them.

However, when the automobile is moving, air flows through the sound hole of microphone at a high speed, forming turbulence and then generating noise. Due to the close proximity of the noise source to the sound hole, it can seriously affect the normal operation of the microphone outside the automobile. Especially when the automobile is moving at a speed over 60 Km/h, strong wind noise may deactivate the microphone from picking up sound. Thus, it is unable for the external microphone to balance the functions of external voice control, and siren detection and penetration.

Therefore, it is necessary to provide an improved microphone module to overcome the problems mentioned above.

SUMMARY OF THE INVENTION

One object of the present disclosure is to provide a microphone module balancing the functions of external voice control, and siren detection and penetration.

A microphone module includes a housing having a receiving cavity and a first sound channel penetrating thereon; a first support member received in the receiving cavity and fixed to the housing; a first microphone mounted on the first support member and configured to pick up sound signal in full frequency rage; and a second microphone mounted on the first support member and configured to pick up sound signal in a frequency range of 700-1500 Hz; wherein a first sound hole corresponding to the first microphone and a second sound hole corresponding to the second microphone are provided on the first support member; the first sound hole and the second sound hole are spaced away from each other; external sound wave entering the first sound channel is transmitted to the first microphone through the first sound hole; external sound wave entering the first sound channel is transmitted to the second microphone through the second sound hole.

As an improvement, the microphone module further includes a second support member arranged between the first support member and the housing; a sound cavity penetrating the second support member is configured to connect the first sound channel with the first sound hole and the second sound hole.

As an improvement, the microphone module further includes a buffer fixed to one side of the housing away from the receiving cavity, and a waterproof membrane fixed to one side of the buffer away from the housing; a second sound channel penetrating the buffer is provided to connect with the first sound channel.

As an improvement, the buffer is made of foam.

As an improvement, a sound signal picked up by the first microphone is output by a first output channel; a sound signal picked up by the second microphone is output by a second output channel.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
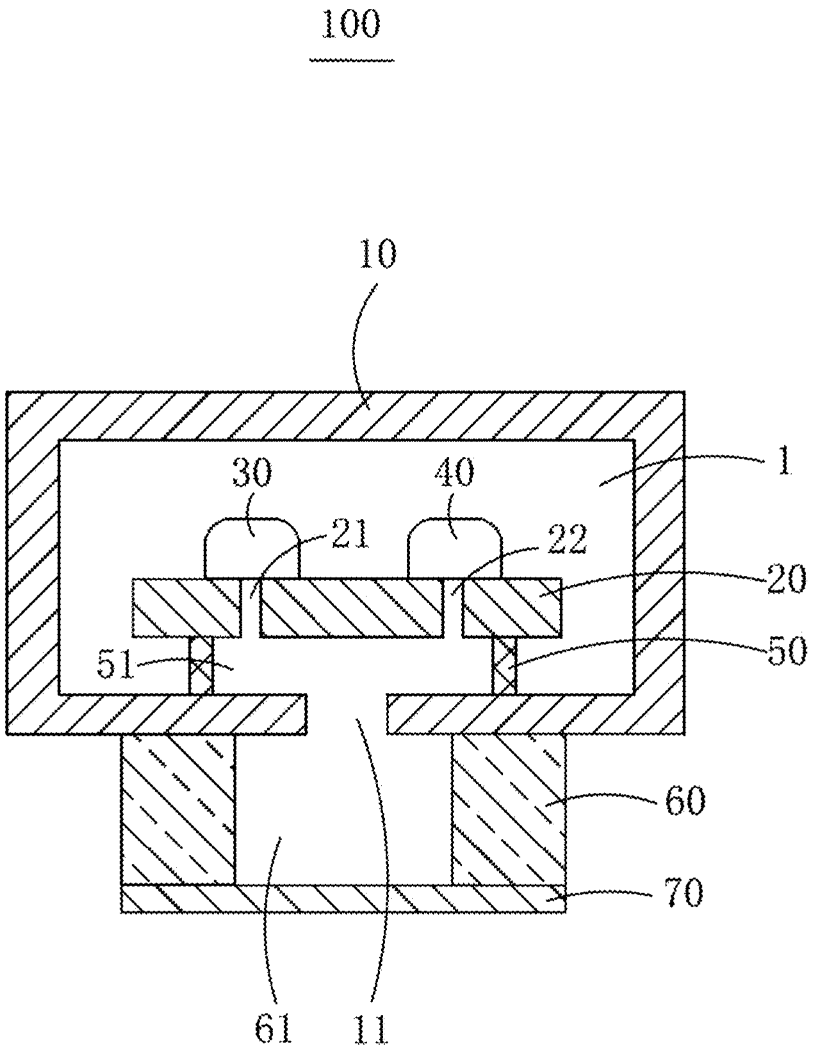
FIG. 1 is a schematic of a microphone module in accordance with an exemplary embodiment of the present disclosure.

Please refer to FIG. 1, a microphone module 100 provided by an exemplary embodiment of the present disclosure includes a housing 10 having a receiving cavity 1, a first support member 20 received in the receiving cavity 1 and fixed to the housing 10, a first microphone 30 mounted on the first support member 20, and a second microphone 40 mounted on the first support member 20. As shown in FIG. 1, the first microphone 30 and the second microphone 40 are mounted on the same side of the first support member 20 at an interval. It can be understood that the first microphone 30 and the second microphone 40 are both received in the receiving cavity 1.

In order to enable the microphone module 100 to pick up external sound signals, a first sound channel 11 is provided on the housing 10 penetrating thereon. Furthermore, a first sound hole 21 and a second sound hole 22 are provided on the first support member 20 penetrating thereon; the first sound hole 21 and the second sound hole 22 are both connected with the first sound channel 11. The first sound hole 21 is arranged corresponding to the first microphone 30; the second sound hole 22 is arranged corresponding to the second microphone 40. Therefore, external sound wave entering the first sound channel 11 is transmitted to the first microphone 30 through the first sound hole 21; external sound wave entering first sound channel 11 is transmitted to the second microphone 40 through the second sound hole 22. The first microphone 30 is configured to pick up sound signal in full frequency rage. The second microphone 40 is configured to pick up sound signal in a frequency range of 700-1500 Hz. The sound signal picked up by the first microphone 30 is output by a first output channel; the sound signal picked up by the second microphone 40 is output by a second output channel. It can be seen that the microphone module 100 has only one first sound channel 11. Sound signals entering the first sound channel 11 are picked up by the first microphone 30 and the second microphone 40 simultaneously.

The microphone module 100 further includes a second support member 50 arranged between the first support member 20 and the housing 10. It can be understood that the second support member 50 is fixed on the housing 10 and covers the first sound channel 11; a sound cavity 51 penetrating the second support member 50 is configured to connect the first sound channel 11 with the first sound hole 21 and the second sound hole 22.

The microphone module 100 further includes a buffer 60 fixed to one side of the housing 10 away from the receiving cavity 1, and a waterproof membrane 70 fixed to one side of the buffer 60 away from the housing 10. A second sound channel 61 penetrating the buffer 60 is provided to connect with the first sound channel 11. The waterproof membrane 70 can effectively prevent the water droplets or water flow outside the automobile from entering the microphone module 100, thus improving the water resistance of the microphone module 100 and ensuring the normal operation of the microphone module 100 even on rainy days. In this embodiment, the buffer 60 is made of foam. In other embodiments, the buffer 60 can be chosen from other materials with buffering.

Figure 2:
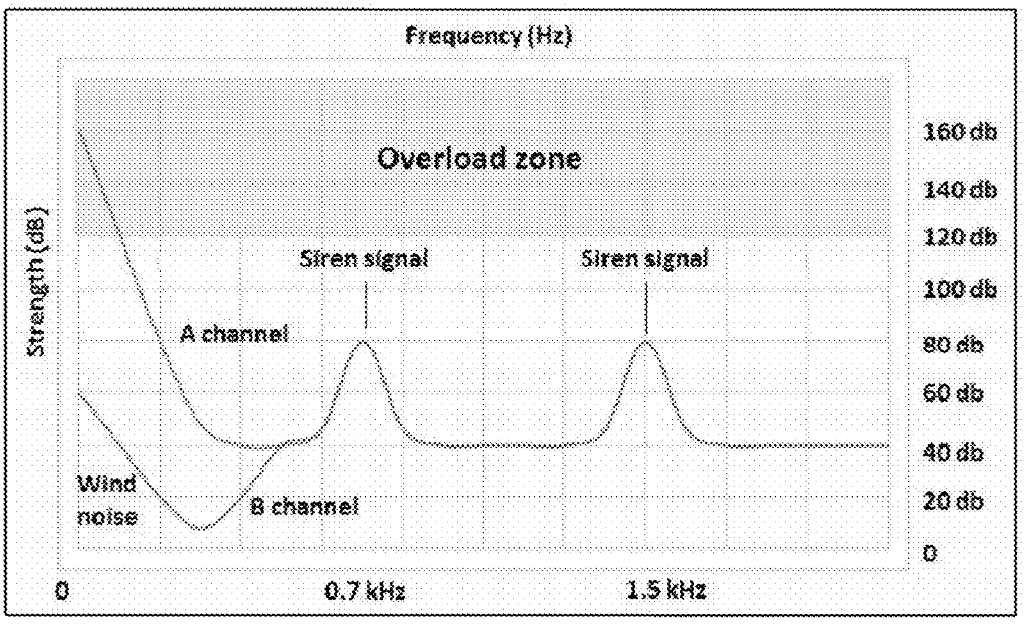
FIG. 2 is acoustic performance curve of a first microphone and a second microphone of the microphone module in FIG. 1.

After entering the second sound channel 61 through the waterproof membrane 70, external sound waves enter the sound cavity 51 through the first sound channel 11, thus being transmitted to the first microphone 30 through the first sound hole 21 and to the second microphone 40 through the second sound hole 22. As shown in FIG. 2, owing that the microphone module 100 has only one first sound channel 11, when the automobile is moving at a relative high speed, external sound wave is picked up by the first microphone 30 and the second microphone 40 simultaneously after entering the first sound channel 11. In related art, the microphone module cannot pick up sound signals in an overload state caused by strong wind noise during high speed moving. In the microphone module 100 in this embodiment, external sound waves enter the sound cavity 51 through the first sound channel 11, and then enter the first microphone 30 and the second microphone 40 respectively after being slightly buffered in the sound cavity 51.

The sound frequency of the police cars, fire trunks or ambulances is between 700-1500 Hz that can be picked up by the second microphone 40. The second microphone 40 can pick up siren sound during high-speed moving, thus avoiding overloading the microphone and ensuring normal operation of siren detection and penetration function. Furthermore, the first microphone 30 is configured to pick up sound signals in full frequency rage, thus ensuring normal operation of external voice control. Consequently, the microphone module 100 can balance the functions of external voice control, and siren detection and penetration.

Figure 3:
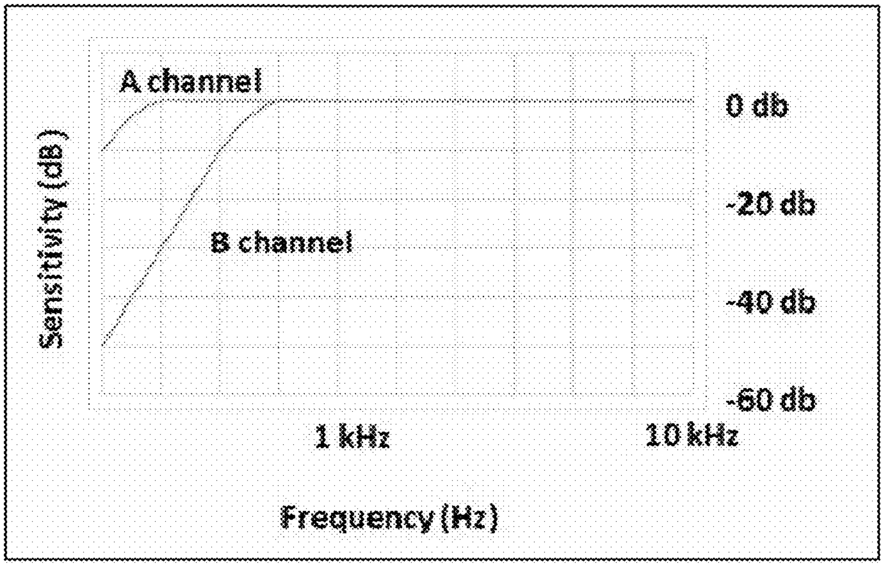
FIG. 3 is acoustic performance curve of a first microphone and a second microphone of the microphone module in FIG. 1

As shown in FIG. 3, when the frequency of the sound signal is lower than the frequency of the siren signal, the sound signal can be picked up by the first microphone 30 and then output by the first output channel (i.e. A Channel shown in FIG. 2). When the frequency of the sound signal is in the frequency range of the siren signal, the sound signal can be picked up by the first microphone 30 and the second microphone 40 simultaneously. It can be understood that when the first microphone 30 is unable to pick up the siren signal due to strong external wind noise, the siren signal is picked up by the second microphone 40 and output through the second output channel (i.e. B channel shown in FIG. 3). If the external wind noise intensity is not sufficient to overload the first microphone 30, the first microphone 30 can still pick up the siren signal.

Compared with the related art, the microphone module of the present disclosure includes a first microphone configured to pick up sound signal in full frequency rage, and a second microphone configured to pick up sound signal in a frequency range of 700-1500 Hz, consequently achieving the suppression of low-frequency wind noise, avoiding the overload of the microphone module, and allowing the microphone module to balance the functions of external voice control and siren detection and penetration.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A microphone module comprising:
- a housing having a receiving cavity and a first sound channel penetrating thereon;
- a first support member received in the receiving cavity and fixed to the housing;
- a first microphone mounted on the first support member and configured to pick up sound signal in full frequency rage; and
- a second microphone mounted on the first support member and configured to pick up sound signal in a frequency range of 700-1500 Hz; wherein
- a first sound hole corresponding to the first microphone and a second sound hole corresponding to the second microphone are provided on the first support member; the first sound hole and the second sound hole are spaced away from each other; external sound wave entering the first sound channel is transmitted to the first microphone through the first sound hole; external sound wave entering the first sound channel is transmitted to the second microphone through the second sound hole.

2. The microphone module as described in claim 1, further comprising a second support member arranged between the first support member and the housing; a sound cavity penetrating the second support member is configured to connect the first sound channel with the first sound hole and the second sound hole.

3. The microphone module as described in claim 1, further comprising a buffer fixed to one side of the housing away from the receiving cavity, and a waterproof membrane fixed to one side of the buffer away from the housing; a second sound channel penetrating the buffer is provided to connect with the first sound channel.

4. The microphone module as described in claim 3, wherein the buffer is made of foam.

5. The microphone module as described in claim 1, wherein a sound signal picked up by the first microphone is output by a first output channel; a sound signal picked up by the second microphone is output by a second output channel.

* * * * *